United States Patent
Ciordas et al.

(10) Patent No.: US 10,089,495 B2
(45) Date of Patent: Oct. 2, 2018

(54) OBFUSCATING ACCESS TO A DATA STORE BY A SOFTWARE APPLICATION

(71) Applicant: Irdeto B.V., Hoofddorp (NL)

(72) Inventors: Calin Ciordas, Hoofddorp (NL); Fan Zhang, Beijing (CN)

(73) Assignee: IRDETO B.V., Hoofddorp (NL)

( * ) Notice: Subject to any disclaimer, the term of this patent is extended or adjusted under 35 U.S.C. 154(b) by 0 days.

(21) Appl. No.: 14/779,285

(22) PCT Filed: Mar. 28, 2013

(86) PCT No.: PCT/EP2013/056704
§ 371 (c)(1),
(2) Date: Sep. 22, 2015

(87) PCT Pub. No.: WO2014/154280
PCT Pub. Date: Oct. 2, 2014

(65) Prior Publication Data
US 2016/0070918 A1    Mar. 10, 2016

(51) Int. Cl.
*G06F 21/62* (2013.01)
*G06F 21/14* (2013.01)
(Continued)

(52) U.S. Cl.
CPC ............ *G06F 21/629* (2013.01); *G06F 21/14* (2013.01); *G06F 21/52* (2013.01); *G06F 21/606* (2013.01);
(Continued)

(58) Field of Classification Search
CPC ........ G06F 21/14; G06F 21/52; G06F 21/606; G06F 21/6254; G06F 21/629;
(Continued)

(56) References Cited

U.S. PATENT DOCUMENTS 5,123,045 A * 6/1992 Ostrovsky ........... G06F 12/1408
380/46
7,770,029 B2 * 8/2010 Venkatesan ......... G06F 12/0802
707/781
(Continued)

FOREIGN PATENT DOCUMENTS

CN  101000649 A  7/2007
CN  105229659 A  1/2016
(Continued)

OTHER PUBLICATIONS

Peter Williams et al., "PrivateFS: a parallel oblivious file system", Oct. 16-18, 2012, Proceedings of the 2012 ACM conference on Computer and communications security, pp. 977-988.*
(Continued)

*Primary Examiner* — Nelson Giddins
(74) *Attorney, Agent, or Firm* — Rimon, P.C.; Marc Kaufman

(57) ABSTRACT

There is described a method of obfuscating access to a data store by a software application. The method comprises accessing the data store using access operations. The access operations comprise real access operations and dummy access operations. Each real access operation is operable to access the data store as part of the execution of the software application. There is also described a computer program which, when executed by a processor, causes the processor to carry out the above method. There is also described a computer readable medium storing the above computer program. There is also described a system configured to carry out the above method.

11 Claims, 3 Drawing Sheets

(51) Int. Cl.
*G06F 21/52* (2013.01)
*G06F 21/78* (2013.01)
*G06F 21/79* (2013.01)
*G06F 21/75* (2013.01)
*G06F 21/60* (2013.01)
*G06F 12/14* (2006.01)

(52) U.S. Cl.
CPC ........ *G06F 21/6254* (2013.01); *G06F 21/755* (2017.08); *G06F 21/78* (2013.01); *G06F 21/79* (2013.01); *G06F 12/1408* (2013.01); *G06F 2221/0748* (2013.01); *G06F 2221/2123* (2013.01)

(58) Field of Classification Search
CPC ..... G06F 2221/0748; G06F 2221/2123; G06F 21/78; G06F 21/79; G06F 21/755; G06F 21/556; G06F 12/1408
See application file for complete search history.

(56) References Cited

U.S. PATENT DOCUMENTS

| | | | | |
|---|---|---|---|---|
| 8,250,648 | B2* | 8/2012 | Kabzinski | G06F 21/78 711/100 |
| 8,909,967 | B1* | 12/2014 | van Dijk | G06F 12/1408 713/150 |
| 2003/0018779 | A1 | 1/2003 | Hughes et al. | |
| 2003/0163718 | A1* | 8/2003 | Johnson | G06F 12/1408 713/193 |
| 2007/0217559 | A1* | 9/2007 | Stott | G11C 7/1051 375/355 |
| 2008/0005476 | A1* | 1/2008 | Venkatesan | G06F 12/0802 711/118 |
| 2009/0183032 | A1* | 7/2009 | Frey | G11C 29/50 714/42 |
| 2010/0106920 | A1* | 4/2010 | Anckaert | G06F 12/1408 711/154 |
| 2010/0223434 | A1* | 9/2010 | Dupaquis | G06F 9/30043 711/154 |
| 2010/0281230 | A1* | 11/2010 | Rabii | G06F 3/0605 711/165 |
| 2011/0047421 | A1* | 2/2011 | Schuette | G11C 16/349 714/718 |
| 2014/0007250 | A1* | 1/2014 | Stefanov | G06F 21/60 726/26 |
| 2014/0281512 | A1* | 9/2014 | Arasu | G06F 21/602 713/165 |
| 2016/0019211 | A1* | 1/2016 | Patey | H04L 9/00 707/747 |
| 2017/0111331 | A1* | 4/2017 | Auradkar | H04L 63/0435 |

FOREIGN PATENT DOCUMENTS

| | | |
|---|---|---|
| EP | 2 979 217 A1 | 2/2016 |
| WO | 2014/154280 A1 | 10/2014 |

OTHER PUBLICATIONS

Shi E., Chan T.H.H., Stefanov E., Li M., "Oblivious Ram with O((logN)3) Worst-Case Cost". 2011, Lee D.H., Wang X. (eds) Advances in Cryptology—ASIACRYPT 2011. ASIACRYPT 2011. Lecture Notes in Computer Science, vol. 7073.*

D. Gligoroski et al., "Cryptcoding : encryption and error-correction coding in a single step", Jun. 26-29, 2006, Proceedings of the 2006 International Conference on Security & Management (SAM 2006), Las Vegas, Nevada, USA / Ed. H.R. Arabnia, S. Aissi.—S.I. : CSREA Press, p. 145-151.*

E. Stefanov and E. Shi, "ObliviStore: High Performance Oblivious Cloud Storage," 2013 IEEE Symposium on Security and Privacy, Berkeley, CA, 2013, pp. 253-267.*

Stefanov E, Shi E, Song D., "Towards practical oblivious RAM", Jun. 18, 2011, arXiv preprint arXiv:1106.3652, p. 1-40.*

Christopher W. Fletcher, Marten van Dijk, and Srinivas Devadas. 2012. A secure processor architecture for encrypted computation on untrusted programs. In Proceedings of the seventh ACM workshop on Scalable trusted computing (STC '12). ACM, New York, NY, USA, 3-8.*

Chenyu Yan, D. Englender, M. Prvulovic, B. Rogers and Yan Solihin, "Improving Cost, Performance, and Security of Memory Encryption and Authentication," 33rd International Symposium on Computer Architecture (ISCA'06), Boston, MA, 2006, pp. 179-190.*

O. Goldreich, "Towards a Theory of Software Protection and Simulation by Oblivious RAMs," 1987, STOC '87 Proceedings of the nineteenth annual ACM symposium on Theory of computing, pp. 182-194.*

Ostrovsky et al., "Efficient computation on oblivious RAMs", May 13-17, 1990, STOC '90 Proceedings of the twenty-second annual ACM symposium on Theory of computing, pp. 514-523.*

Communication Pursuant to Article 94(3) EPC cited in corresponding European Application No. 13712803.9 dated Nov. 24, 2016.

Fletcher et al: "A secure processor architecture for encrypted computation on untrusted programs", Jan. 1, 2012.

International Search Report and Written Opinion cited in corresponding International Application No. PCT/EP2013/056704 dated Jul. 11, 2013.

Elaine Shi et al. "Oblivious RAM with 0 ((log N)<3>) Worst-Case Cost", International Association for Cryptologic Research, vol. 20111129:051758, Nov. 29, 2011, pp. 1-18.

Benny Pinkas et al. "Oblivious RAM Revisited", International Association for Cryptologic Research, vol. 20100625:125210, Jun. 22, 2010, pp. 1-11.

Danilo Gligoroski et al. "Cryptocoding-Encryption and Error-Correction Coding in a Single Step", Proceedings of 2006 International Conference on Security & Management, Nov. 30, 2006, pp. 124-151.

Chenyu Yan et al: "Improving Cost, Performance, and Security of Memory Encryption and Authentication",Computer Architecture, 2006, 33rd International Symposium on Boston, MA, Jun. 17-21, 2006, pp. 179-190.

First Office Action dated Oct. 27, 2017 issued by the State Intellectual Property Office (SIPO) China in connection with Chinese Application No. 201380076947.4, 15 pages.

Communication under Rule 71 (3) EPC received in corresponding European Application No. 13712803.9 dated Nov. 7, 2017, 69 pages.

International Preliminary Report on Patentability issued by WIPO dated Oct. 8, 2015 in connection with international Patent Application No. PCT/EP2013/056704, 7 pages.

* cited by examiner

PRIOR ART

OBFUSCATING ACCESS TO A DATA STORE BY A SOFTWARE APPLICATION

The present application is the United States national stage of International Application No. PCT/EP2013/056704, filed Mar. 28, 2013, the entire content of which is incorporated herein by reference.

FIELD OF THE INVENTION

The present invention relates to obfuscating access to a data store by a software application.

BACKGROUND OF THE INVENTION

Software applications (or programs) may be executed locally (on a client device) or over a network via a web browser, for example. A browser application can also run in the browser in the offline mode (locally) behaving like a native one running locally.

When a software application is being executed by a processor, the environment in which the execution is being performed is a so-called "white-box" environment if the user (or a third party) has access to the processing so that the user can observe and alter the execution of the software application (e.g. by running a suitable debugger)—such alterations could be changes to the process flow or changes to the data being processed. This observation and/or alteration of the execution of the software application may be referred to as tampering. The user may observe or alter (or in other words tamper with) the execution of the software application in order to satisfy their own aims or goals, which may not be possible to satisfy if the software application were to run normally without being tampered with. Such tampering to achieve a particular aim or goal may be referred to as goal-directed tampering. Goal-directed tampering may involve, for example, observing and/or altering the execution of a software application being run in a white-box environment in order to obtain or deduce a cryptographic key that is used by the software application to process digital data (e.g. a decryption key for decrypting data).

Various techniques are known for protecting the integrity of a data processing software application (or program or system) which is being run in a white-box environment. One exemplary technique can be found in "White-Box Cryptography and an AES Implementation", by Stanley Chow, Philip Eisen, Harold Johnson, and Paul C. Van Oorschot, in Selected Areas in Cryptography: 9$^{th}$ Annual International Workshop, SAC 2002, St. John's, Newfoundland, Canada, Aug. 15-16, 2002, the entire disclosure of which is incorporated herein by reference. Such techniques generally aim to hide the embedded knowledge of the application by introducing additional complexity and/or randomness in the control and/or data paths of the software application. This additional complexity and/or randomness has the effect of obscuring or obfuscating the information (or data) or execution path of the software application. As a result of this obfuscation, it becomes more difficult to extract information from the application by code inspection and it is more difficult to find and/or modify the code that is associated with particular functionality of the software application. It is therefore much more difficult for an attacker with access to the software application running in a white-box environment to retrieve sensitive data or alter the operation of the software application in order to meet their own goals by tampering with the execution of the software application. As such, the ability of the attacker to carry out goal-directed tampering is reduced. These techniques which aim to reduce the ability of an attacker to carry out goal-directed tampering may be considered to improve the tamper-resistance of the software. If it is sufficiently difficult for an attacker to carry out goal-directed tampering, then, for any practical purposes, the software application may be considered to be tamper-resistant, even if theoretically tampering is still possible.

When a software application is being executed by a processor, the software application generally requires access to a data store or database or memory. Data stored in a data store may be encrypted or transformed so as to provide a further barrier for a potential attacker. Such a data store may be considered as a "protected" data store.

The prior art described above is schematically illustrated in FIG. 1. In particular, FIG. 1 shows a software application 10 which includes a "protected" (or tamper-resistant) part 12, and a "protected" data store 14. However, any interactions 16 between the protected part 12 of the application 10 and the protected data store 14 are still visible to an attacker. In other words, access 16 to the data store 14 by the software application 10 is visible to an attacker.

The present invention seeks to obfuscate access to a data store by a software application.

SUMMARY OF THE INVENTION

As mentioned above with reference to FIG. 1, any interactions between the protected part 12 of the application 10 and the protected data store 14 are visible to an attacker. Simple tracking of data store access (e.g. in terms of timings, locations, patterns, sizes and frequencies) can provide a potential attacker with enough information about why, how, or when the application 10 is using this data, thereby giving the attacker a starting point in analysing it. Examples are the use of a form to select preferences or to input data—an attacker can correlate these actions with data store accesses, understanding that this kind of information is stored locally. Once the attacker starts to analyse the execution of the software application 10 in this way, the application 10 may eventually be hacked. The present invention aims to make it difficult for an attacker to analyse data store access, in the presence of a visible/traceable interface 16 between the application 10 and the data store 14.

According to a first aspect of the present invention, there is provided a method of obfuscating access to a data store by a software application. The method comprises accessing the data store using access operations. The access operations comprise real access operations and dummy access operations. Each real access operation is operable to access the data store as part of the execution of the software application.

In some embodiments, the access operations are arranged to access the data store periodically during execution of at least a portion of the software application.

In some embodiments, for at least one of the real access operations, one or more dummy access operations occur in temporal proximity to said at least one real access operation.

In some embodiments, the dummy access operations are arranged to access at least one specified dummy storage location in the data store more frequently than other dummy storage locations in the data store.

In some embodiments, the access operations are arranged to access the data store substantially evenly across at least a subset of storage locations in the data store.

In some embodiments, the access operations comprise READ operations. Each READ operation is operable to read a value from a respective storage location of the data store. The real access operations comprise one or more real READ operations and the dummy access operations comprise one or more dummy READ operations.

In some embodiments, the access operations comprise WRITE operations. Each WRITE operation is operable to write a value to a respective storage location of the data store. The real access operations comprise one or more real WRITE operations and the dummy access operations comprise one or more dummy WRITE operations.

In some embodiments, the access operations comprise READ/WRITE pairs. Each READ/WRITE pair is operable to read a value from a respective storage location of the data store and to subsequently write a value to said respective storage location. The real access operations comprise one or more real READ/WRITE pairs and the dummy access operations comprise one or more dummy READ/WRITE pairs.

At least one of the real READ/WRITE pairs may comprises a real WRITE operation of the software application that is operable to write a specified value to a specified storage location of the data store during execution of the software application. In this case, said at least one of the real READ/WRITE pairs is operable to read a value from the specified storage location and to subsequently write the specified value to the specified storage location.

At least one of the real READ/WRITE pairs may comprises a real READ operation of the software application that is operable to read an encoded value X from a specified storage location of the data store during execution of the software application. In this case, said at least one of the real READ/WRITE pairs is operable to read the encoded value X from the specified storage location and to subsequently write an amended encoded value X' to the specified storage location. X' is chosen such that a decoded version of X' is the same as a decoded version of X. Optionally, X and X' may be decoded using an error correction code, ECC, where ECC(X)=ECC(X').

In one embodiment, the method further comprises executing the dummy access operations by distributing the dummy access operations amongst the real access operations of the software application.

In one embodiment, the access operations comprise a time-varying distribution of the dummy access operations amongst the real access operations.

In one embodiment, there is provided a method of obfuscating access to local storage on a client device by a software application. The method comprises the steps of: (a) generating dummy local storage access operations, each dummy local storage access operation being operable to access the local storage; (b) generating a schedule of local storage access operations, the schedule comprising the generated dummy local storage access operations and real local storage access operations of the software application, each real local storage access operation being operable to access the local storage as part of the execution of the software application; and (c) accessing the local storage in accordance with the generated schedule. Advantageously, the schedule comprises the dummy local storage access operations distributed amongst the real local storage access operations According to a second aspect of the present invention, there is provided a computer program which, when executed by a processor, causes the processor to carry out a method according to the first aspect.

According to a third aspect of the present invention, there is provided a computer readable medium storing a computer program according to the second aspect.

According to a fourth aspect of the present invention, there is provided a system configured to carry out a method according to the first aspect.

Other preferred features of the present invention are set out in the appended claims.

BRIEF DESCRIPTION OF THE DRAWINGS

Embodiments of the present invention will now be described by way of example with reference to the accompanying drawings in which.

DETAILED DESCRIPTION OF A PREFERRED EMBODIMENT

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
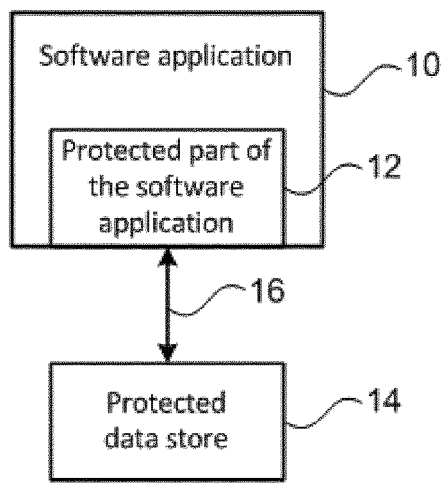
FIG. 1 is a schematic illustration of access to a data store by a software application according to the prior art.
Figure 2:
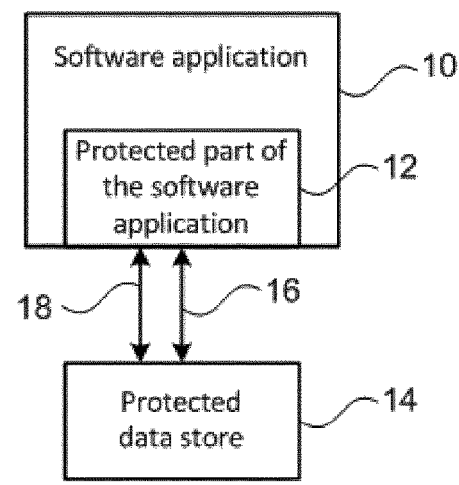
FIG. 2 is a schematic illustration of access to a data store by a software application according to one embodiment of the present invention.

FIG. 2 provides a high level schematic illustration of a method of obfuscating access to the data store 14 by the software application 10 in accordance with the present invention. In particular, according to the present method, the data store is accessed using access operations which include real access operations 16 and dummy access operations 18, thereby obfuscating (or protecting, or masking, or hiding, or concealing, or disguising, or obscuring, or screening, or camouflaging) the real local storage access operations. The real access operations 16 are operable to access the data store 14 as part of the execution of the software application 10. The dummy access operations 18 are additional access operations that are also operable to access the data store 14. However, the dummy access operations 18 have no substantial effect on execution of the software application 10, i.e. the dummy access operations 18 are "dummy" access operations from the point of view of the software application 10. In other words, the dummy access operations 18 are redundant to the execution of the software application 10. Thus, the dummy access operations are provided in order to confuse an attacker and make it harder for the attacker to understand how the application 10 works since it is impossible for the attack to know for definite whether a given access operation is a real access operation 16 or a dummy access operation 18. In other words, the inclusion of the dummy access operations 18 increases the obscurity of data store accesses in order to frustrate an attacker. Hence, the present invention may be considered to provide a "protected" or "tamper-resistant" interface between the software application 10 and the data store 14, despite the fact that all interactions between the software application 10 and the data store 14 are visible to a potential attacker.

Besides the above-mentioned advantages of obstructing an attacker, the present methodology can also provide increased diversity to a software application. This diversity relates to using different ways to mask the access to the data store 14, e.g. looking at combinations of (a) how the data store access pattern is created and (b) how the real access operations 16 are embedded in the data store access pattern.

Figure 3:
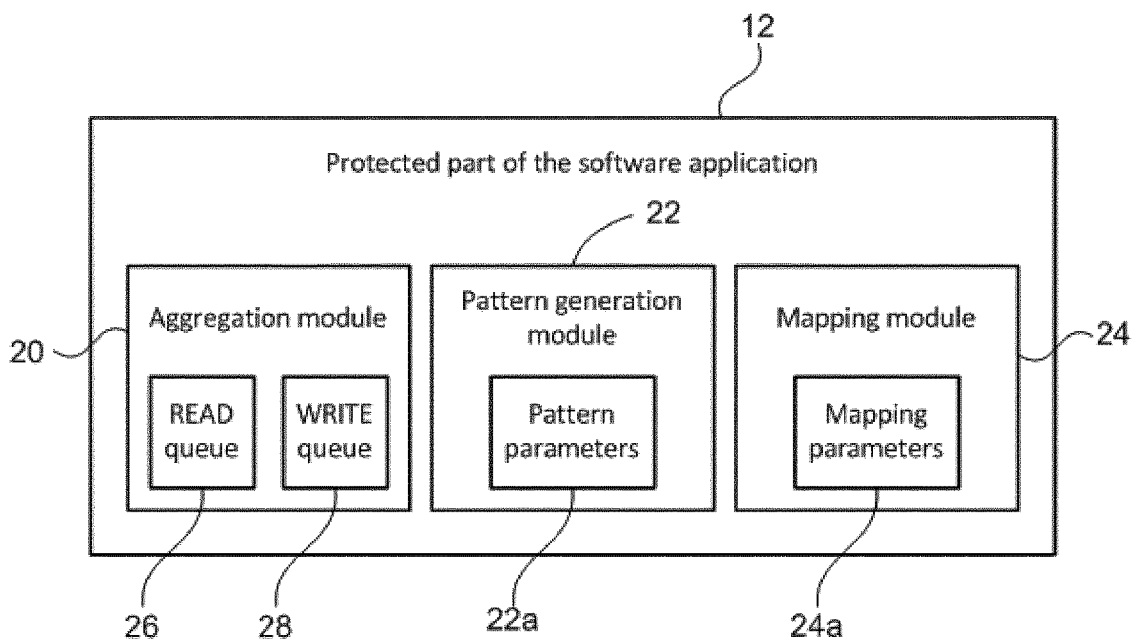
FIG. 3 is a schematic illustration of software modules within a protected part of a software application which enable access to a data store according to one embodiment of the present invention.

The dummy access operations 18 are specific to a particular software application 10 (i.e. they are application specific). In one embodiment, the dummy access operations 18 are created and executed by modules in the protected part 12 of the software application 10. Under the assumption that the protected part 12 of the software application 10 is impenetrable to an attacker, the (timing of the) real access operations 16 will only be visible within this protected part 12 of the software application 10 such that the (timing of the) real access operations 16 is disguised at the open Application Programming Interface (API) call level. An exemplary high level architecture is shown schematically in FIG. 3. In particular, the protected part 12 of the software application 10 of FIG. 3 includes an aggregation module 20, a pattern generation module 22 and a mapping module 24.

The aggregation module 20 is operable to aggregate the real access operations 16 from the software application 10 into one or more queues. For example, the real access operations 16 may comprise real READ operations and real WRITE operations. An example of a READ operation is X=READ(x) where X is a value read from a storage location x in the data store 14. An example of a WRITE operation is WRITE(Y,y) where Y is a value to be written to a storage location y in the data store 14. The aggregation module 20 may aggregate the real access operations 16 of the software application 10 into a READ queue 26 and a WRITE queue 28, as appropriate.

The pattern generation module 22 is operable to generate (or create) a data store access pattern independent of the rest of the software application 10. The pattern generation module 22 can be configured via pattern parameters 22a to generate a desired data store access pattern. For example, the pattern parameters 22a may be used to configure the timings of data store access, or the frequencies of access of particular storage locations in the data store 14. Further examples are given below with reference to the exemplary embodiments shown in FIGS. 4 and 5.

The mapping module 24 is operable to map the real access operations 16 (as aggregated by the aggregation module 20) to the data store access pattern generated by the pattern generation module 22. In other words, the mapping module 24 is operable to embed the real access operations 16 into the data store access pattern generated by the pattern generation module 22. The mapping module 24 can be configured via mapping parameters 24a to generate a desired mapping. For example, the mapping parameters 24a may be used to configure how many dummy access operations 18 are provided per real access operation 16. Further examples are given below with reference to the exemplary embodiments shown in FIGS. 4 and 5.

Using the pattern generation module 22 and the mapping module 24, it is possible to change the data store access pattern and the mapping pattern at run-time via simple parameter passing (i.e. using the pattern parameters 22a and the mapping parameters 24a). Alternatively, a schedule of a sequence of data store access patterns and/or mapping patterns could be pre-provisioned to the software application 10, or locally created by the client device running the software application 10 (e.g. based on a digital fingerprint of the client device), or network provisioned at run-time from a (diversity controlling) server, or any combination of these options. All these options allow dynamic diversity.

It will be understood that the software application 10 of FIG. 2 may in fact comprise multiple protected parts 12, some or all of which are operable to access the data store. In addition, it will be understood that the protected part 12 (or multiple protected parts 12) of the software application of FIG. 2 may be operable to access multiple different protected data stores 14. For example, a single software application 10 may have one or more protected parts 12 operable to access file storage and web storage. Obfuscation may be provided across individual or multiple accesses between protected parts 12 and data stores 14.

"Constant Flow" Embodiment

In one advantageous embodiment, the pattern generation module 22 may be operable to generate a data store access pattern which provides a relatively constant flow of READ and/or WRITE operations. In other words, the access operations 16 and 18 may be arranged to access the data store 14 periodically during execution of at least a portion of the software application 10. An example of a constant flow of access operations is shown in FIG. 4 in relation to READ operations.

Figure 4:
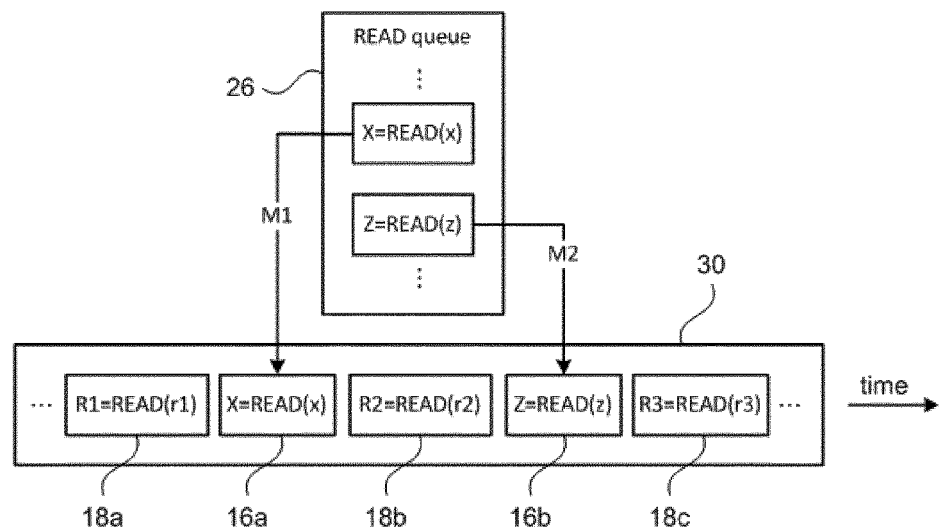
FIGS. 4 and 5 are schematic illustrations of data store access using READ operations in accordance with two embodiments of the present invention.

FIG. 4 shows a READ queue 26 including two real READ operations 16a and 16b. It will be understood that further real READ operations 16 may be included as part of the READ queue 26, but only two are shown in FIG. 4 for the purposes of illustration. According to FIG. 4, the pattern generation module 22 is operable to create a data store access pattern 30 having READ operations at regular (or fixed) time intervals, so one of the pattern parameters 22a may comprise a READ periodicity parameter, for example. Thus, the data store access pattern 30 of FIG. 4 may provide a permanent constant rate of READ operations (say one READ operation every second). Three dummy READ operations 18a-c have been generated. These dummy READ operations may be generated by the pattern generation module 22 or by a separate dummy access operation generation module (not shown). The dummy READ operations are operable to read data from valid/existing storage locations in the data store 14. The mapping module 24 is operable to map the two real READ operations 16a and 16b to the data store access pattern 30, as indicated by mapping arrows M1 and M2 in FIG. 4. In particular, FIG. 4 shows the real READ operations 16 interspersed (or intermixed, or distributed, or dispersed, or spread) between dummy READ operations 18. This interspersing may be configured by a mapping parameter 24a which specifies that there is one dummy READ operation 18 followed by one real READ operation 16, and so on. Of course, if there are no real READ operations 16 in the READ queue 26, the mapping module 24 may be operable to use dummy READ operations 18 in place of the real READ operations. In FIG. 4, the data store access pattern 30 comprises READ operations in the following order: first dummy READ operation 18a, first real READ operation 16a, second dummy READ operation 18b, second real READ operation 16b, and third dummy READ operation 18c, but it will be appreciated that other orderings would be possible.

Thus, in this embodiment, the data store access pattern may provide periodic READ operations to access the data store 14 (e.g. one READ operation every second). It will be understood that the periodicity may be changed as appropriate. In other words, the number of access operations 16 and 18 per second may be increased or decreased dependent on the software application 10. For example, a software application 10 which itself requires a relatively large number of real access operations 16 per second will require a higher periodicity than another software application 10 which requires a significantly lower number of real access operations 16 per second. It will also be understood that the periodicity may relate to access operations 16 and 18 in general, or may relate to READ operations alone, or may relate to WRITE operations alone, or may relate to a combination of READ and WRITE operations. For example, the data store access pattern may provide two READ operations followed by one WRITE operation every 2 seconds. It will be appreciated that many other data store access patterns are available within the scope of the present method. For example, the order of the READ and WRITE operations may be swapped, (although it would be necessary to take care of any data dependencies between the READ and WRITE operations in this case). Alternatively, the relative number of READ and WRITE operations in the data store access pattern may be altered. Additionally, the relative number and ordering of real and dummy access operations may be altered. When using WRITE operations, it is possible to use dummy storage locations in the data store 14 so that the values written in these dummy storage locations have no impact on the execution of the software application 10.

In this "constant flow" embodiment, an attacker can only see the relatively constant flow of access operations (i.e. open API calls). Without understanding how the protected part 12 of the software application 10 works, the attacker is not able to identify which access operations are real (i.e. real access operations 16 required by the software application 10) and which are dummy access operations 18 introduced by the software application 10 for obfuscation purposes, thus raising the security bar. In other words, an analysis of the access operations 16 and 18 will not provide any value, so the attacker is not able to get an initial hook to start his reverse-engineering work "Temporal Burst" Embodiment As described above, the data store access pattern may provide a constant flow of accesses to the data store 14. This would, however, incur a performance penalty, particularly if the vast majority of the access operations are in fact dummy access operations 18 (as desired for increased security). Therefore, in another advantageous embodiment, the pattern generation module 22 may be operable to generate a data store access pattern which provides temporal bursts of READ and/or WRITE operations. In other words, for at least one of the real access operations 16, one or more dummy access operations 18 may occur in temporal proximity to the at least one real access operation 16. This temporal burst embodiment is particularly useful in instances when access to the data store 14 is very limited but still needs to be complemented by dummy data. For increased security, this temporal burst embodiment may also introduce extra bursts of only dummy access operations 18 when the software application 10 does not require any data from the data store 14. The temporal burst embodiment may reduce the performance penalty of the obfuscation methodology as compared to the constant flow embodiment of FIG. 4. Thus, this "temporal burst" embodiment provides bursts of dummy access operations around real access operations so that the real access operations are disguised amongst a burst of dummy access operations. A temporal burst example relating to READ operations is shown in FIG. 5.

Figure 5:
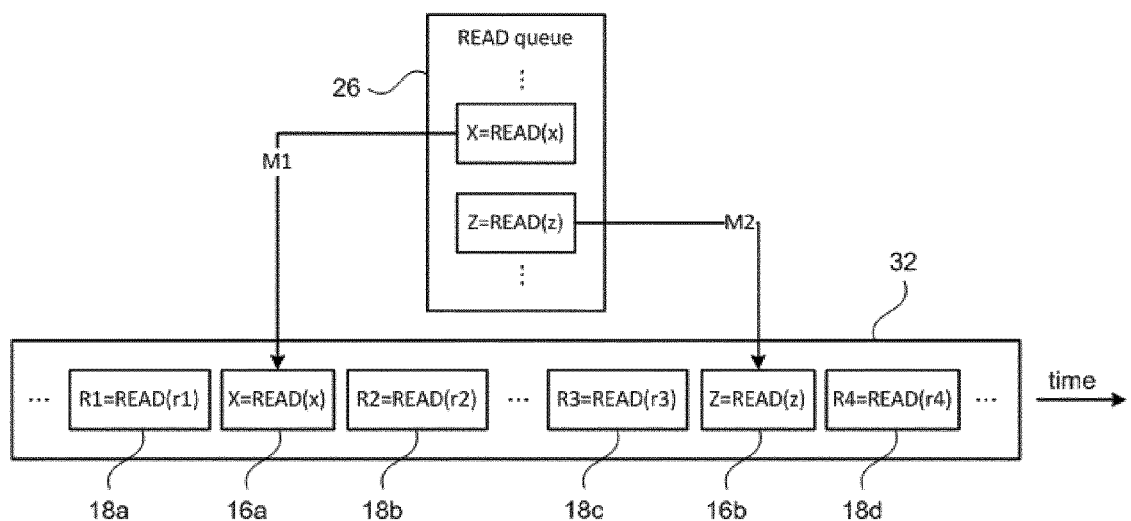

Like FIG. 4, FIG. 5 shows a READ queue 26 including two real READ operations 16a and 16b. It will be understood that further real READ operations 16 may be included as part of the READ queue 26, but only two are shown in FIG. 5 for the purposes of illustration. According to FIG. 5, the pattern generation module 22 is operable to create a data store access pattern 32 having READ operations in two distinct temporal bursts, so the pattern parameters 22a may comprise one or more of a burst size parameter relating to the number of READ operations in a burst, a burst separation parameter relating to the temporal separation between bursts, and a burst duration parameter relating to the total temporal duration of each burst, for example. Thus, the data store access pattern 32 of FIG. 5 may provide a periodic burst of READ operations (e.g. three grouped READ operations every three seconds). Four dummy READ operations 18a-d have been generated in the exemplary embodiment of FIG. 5. As for FIG. 4, these dummy READ operations may be generated by the pattern generation module 22 or by a separate dummy access operation generation module (not shown). The mapping module 24 is operable to map the two real READ operations 16a and 16b to the data store access pattern 32, as indicated by mapping arrows M1 and M2 in FIG. 5. In particular, FIG. 5 shows each burst of READ operations including a real READ operation 16 between two dummy READ operations 18. This interspersing may be configured by mapping parameters 24a which specify the number of dummy READ operations 18 per real READ operation 16, and the location of the real READ operations 16 in each burst. In FIG. 5, the data store access pattern 32 comprises a first burst of READ operations in the following order: first dummy READ operation 18a, first real READ operation 16a, second dummy READ operation 18b. The data store access pattern 32 further comprises a second burst of READ operations at some time after the first burst of READ operations. The ordering and constituents of the second burst of READ operations are as follows: third dummy READ operation 18c, second real READ operation 16b, fourth dummy READ operation 18d. It will be appreciated that other orderings within the first or second bursts would be possible. It will further be appreciated that the relative number of real and dummy access operations may be altered Thus, in this "temporal burst" embodiment, the data store access pattern may provide temporal bursts of READ operations to access the data store 14 (e.g. one burst every three seconds, three READ operations per burst, and each burst lasting for one second). It will be understood that the pattern parameters 22a may be changed as appropriate dependent on the software application 10. For example, a software application 10 which itself requires a relatively large number of real access operations 16 per second might have a higher number of bursts per second than another software application 10 which requires a significantly lower number of real access operations 16 per second. Another option in this case would be to decrease the time period between bursts so as to increase the frequency of real READ operations. A further option would be to change the mapping parameters 24a so as to map more real READ operations 16 into each burst. It will also be understood that the use of temporal bursts may relate to access operations 16 and 18 in general, or may relate to READ operations alone, or may relate to WRITE operations alone, or may relate to a combination of READ and WRITE operations. For example, the data store access pattern may provide a periodic burst of fifty READ and/or WRITE operations every twenty seconds, possibly with a random mix of READ and WRITE operations. In another example, the data store access pattern and mappings may provide a burst of twenty access operations when at least two real WRITE operations are scheduled according to the WRITE queue 28 of the aggregation module. In a similar example, the data store access pattern and mappings may provide a burst of ten access operations when at least one real READ operations is scheduled according to the READ queue 26 of the aggregation module. Another example would be a pattern generation module 22 and mapping module 24 which embed two real access operations 16 in a burst of twenty access operations 16 and 18. Another similar example would be a pattern generation module 22 and mapping module 24 which embed four real access operations 16 in a burst of ten access operations 16 and 18. It will be appreciated that many other data store access patterns and mappings are available within the scope of the present method by varying pattern parameters 22a and mapping parameters 24a relating to the bursts of access operations 16 and 18.

It will be appreciated that the pattern generation module 22 may be operable to combine the "constant flow" and "temporal burst" embodiments described above. For example, it would be possible to provide a background constant flow of access operations with occasional bursts of access operations. Alternatively, it would be possible to provide a constant flow of bursts of access operations. Alternatively, it would be possible to provide temporal bursts of access operations for a first period of time, followed by a constant flow of access operations for a second period of time, for example. It will be appreciated that other such combined embodiments are also possible given particular pattern parameters 22a and mapping parameters 24a, all of which may vary over time.

"READ/WRITE Pairs" Embodiment

As mentioned above, the embodiments of FIGS. 4 and 5 are equally applicable for WRITE operations. Notably, READ operations do not impact on data stored in the data store 14, since READ operations merely fetch data from the data store 14. In contrast, a WRITE operation produces a lasting (observable) effect on data stored in the data store 14 as either a value is written to a new (i.e. previously unused) storage location in the data store 14, or a new value is written to an existing (i.e. in use) storage location in the data store 14. Therefore, in contrast to dummy READ operations, dummy WRITE operations may increase the storage size (i.e. such operations may increase the amount of data stored in the data store 14). In particular, a dummy WRITE operation involving a new storage location will increase the storage size. Furthermore, a dummy WRITE operation to an existing storage location would alter the value stored in that location, so dummy WRITE operations are generally only possible at so-called "dummy storage locations" where only dummy data is stored, and not where real application data is stored.

Therefore, to further frustrate an attacker, it is possible to pair READ and WRITE operations, whereby a given pairing relates to the same storage location in the data store 14. In other words, a READ/WRITE pair reads data from and writes data to the same storage location. An attacker can only see the flow of paired READ and WRITE operations. In this case, the attacker is not able distinguish between a READ operation and a WRITE operation. A real READ/WRITE pair contains one real access operation, whether it is the READ operation or the WRITE operation. A dummy READ/WRITE pair does not include any real access operations so that both the READ operation and the WRITE operation are dummy access operations. A dummy READ/WRITE pair may read from and write to either an existing dummy location or a new dummy location. Furthermore, the attacker is not able to distinguish between a real READ/WRITE pair and a dummy READ/WRITE pair. Assuming that the attacker also can monitor the content of the data store 14, it is desirable for every READ/WRITE pair (dummy or real) to have an impact on the amount of data stored in the data store 14 such that the amount and values of data stored in the data store 14 is continually changing. An example of a constant flow of access operations is shown in FIG. 6 in relation to READ/WRITE pairs.

Figure 6:
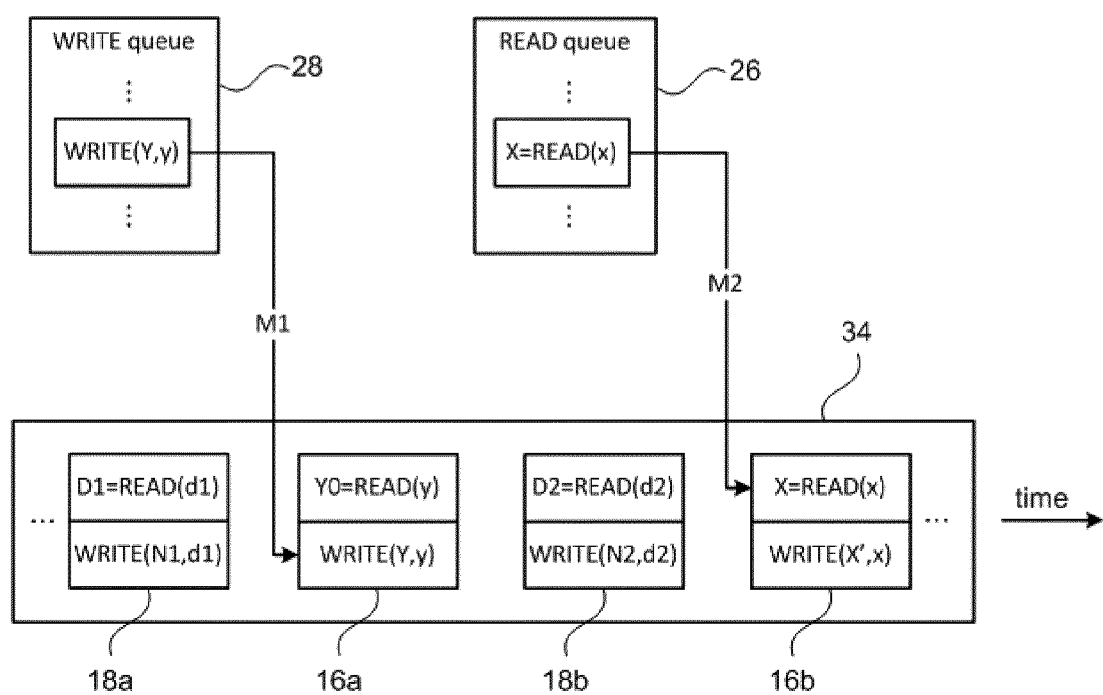
FIG. 6 is a schematic illustration of data store access using paired READ and WRITE operations in accordance with a further embodiment of the present invention.

FIG. 6 shows a READ queue 26 including one real READ operation (X=READ(x)) and a WRITE queue 28 including one real WRITE operation (WRITE(Y,y)). It will be understood that further real READ and WRITE operations may be included as part of the READ and WRITE queues 26 and 28 respectively, but only one per queue are shown in FIG. 6 for the purposes of illustration. According to FIG. 6, the pattern generation module 22 is operable to create a data store access pattern 34 having paired READ and WRITE operations at regular time intervals, so that one of the pattern parameters 22a may comprise a periodicity parameter, for example. Each READ/WRITE pair is operable to read a value from a respective storage location of the data store 14 and to subsequently write a value to said respective storage location.

Two dummy READ/WRITE pairs 18a and 18b have been generated in the embodiment of FIG. 6. These dummy READ/WRITE pairs may be generated by the pattern generation module 22 or by a separate dummy access operation generation module (not shown). In the embodiment of FIG. 6, dummy storage locations in the data store 16 are used in connection with the dummy READ/WRITE pairs 18. The first dummy READ/WRITE pair 18a initially reads a value D1 from a first dummy storage location d1 and then writes a dummy value N1 to the first dummy storage location d1. The second dummy READ/WRITE pair 18b initially reads a value D2 from a second dummy storage location d2 and then writes a dummy value N2 to the second dummy storage location d2.

The mapping module 24 is operable to map the real WRITE operation from the WRITE queue 28 to a WRITE operation in a real READ/WRITE pair 16a in the data store access pattern 34, as indicated by mapping arrow M1 in FIG. 6. As mentioned above, the read WRITE operation is operable to write a value Y to a storage location y in the data store 14 (i.e. WRITE(Y,y)). Inclusion of this real WRITE operation in a real READ/WRITE pair is relatively simple and is achieved using a real READ/WRITE pair 16a defined by an initial READ operation Y0=READ(y) which reads the current value Y0 from the storage location y, and a subsequent WRITE operation identical to the real WRITE operation from the WRITE queue 28 (i.e. WRITE(Y,y)). Thus, the effect of the real READ/WRITE pair 16a is to read data from the storage location y in the data store 14, and then to perform the desired real WRITE operation at that same storage location y. Due to the WRITE operation, there is a visible effect on the data stored in the data store 14.

The mapping module 24 is further operable to map the real READ operation from the READ queue 26 to a READ operation in a real READ/WRITE pair 16b in the data store access pattern 34, as indicated by mapping arrow M2 in FIG. 6. As mentioned above, the real READ operation is operable to read a value X from a storage location x in the data store 14 (i.e. X=READ(x)). Inclusion of this real READ operation in a real READ/WRITE pair is slightly more complicated as a READ operation normally has no visible effect on the data stored in the data store 14. Therefore, to alleviate this for storage locations x which are already in use, the real READ operation is included using a real READ/WRITE pair 16b defined by an initial READ operation identical to the real READ operation from the READ queue 26 (i.e. X=READ (x)), and a subsequent WRITE operation WRITE(X',x) which writes a new value X' to the storage location x. Importantly, the new value X' can be converted back to the original read value X. In other words, values X and X' are both encoded values where X' is chosen such that a decoded version of X' is the same as a decoded version of X. It is only ever the decoded version of X (or X') which is used by the software application 10, so there is no effect on the software application 10 by replacing the real encoded data value X with an alternative encoded data value X'. Thus, the effect of the real READ/WRITE pair 16b is to perform the desired READ operation from the READ queue 26 and then to write an amended version X' of the data value X to the relevant storage location x, but both X and X' are indistinguishable to the software application as they are used in a decoded form. In other words, there exists a decoding function DECODE used by the software application 10 such that DECODE(X')=DECODE(X) and only the decoded version of X (or X') is used in the software application. One example is the use of a error correction code (ECC) in which all data values are stored in the data store 14 in an encoded format including redundant information. A simplistic example of an ECC is to store each data bit three times and to decode by "majority vote". E.g. a data bit 0 may initially be stored in the data store 14 as X=000, and may be re-written as X'=001 or 010 or 100 since ECC(X)=ECC(X')=0 in all cases (i.e. ECC(000)=ECC(001)=ECC(010)=ECC(100)). The same effect can be achieved with techniques other than ECCs, e.g. cryptography and key management. There is no need for the mapping module 24 to remember real/dummy storage locations since, as mentioned above, the software application 10 will only request real (i.e. decoded) data from the data store 14. Thus, all data is stored in the data store 14 in an encoded format, regardless of whether it originates from a real WRITE operation in a real READ/WRITE pair, or a real READ operation in a real READ/WRITE pair, or a dummy READ/WRITE pair.

Notably, the first real READ/WRITE pair 16a (which includes a real WRITE operation) and the second real READ/WRITE pair 16b (which includes a real READ operation) are indistinguishable to an attacker since they both perform a READ operation followed by a WRITE operation, and the data stored in the data store 14 is modified (by the WRITE operation) in each case. In other words, when using READ/WRITE pairs, an attacker cannot even distinguish between READ and WRITE operations, and even if the attacker is able to observe the contents of the data store 14, this would not help since the data storage would always be changing.

FIG. 6 shows the real READ/WRITE operations 16 interspersed between dummy READ/WRITE pairs 18 in accordance with instructions from the mapping module 24. This interspersing may be configured by a mapping parameter 24a which specifies that there is one dummy READ/WRITE pair 18 followed by one real READ/WRITE pair 16, and so on. In FIG. 6, the data store access pattern 34 comprises READ/WRITE pairs in the following order: first dummy READ/WRITE pair 18a, first real READ/WRITE pair 16a, second dummy READ/WRITE pair 18b, and second real READ/WRITE pair 16b, but it will be appreciated that other orderings would be possible.

There may be some dependencies involved, e.g. it is not possible to read data that has not been written yet. However, by keeping track of the read/write locations x and y used in the real READ and WRITE operations in the READ and WRITE queues 26 and 28, it is possible to ensure that no conflicts arise. Furthermore, the aggregation module 20 is able to mix, reorder, or aggregate READ operations in read blocks.

FIG. 6 shows an embodiment including a constant flow of READ/WRITE pairs. Therefore, all the constant flow considerations described above with reference to the READ only embodiment of FIG. 4 are equally applicable in this case. Furthermore, whilst FIG. 6 shows an embodiment including a constant flow of READ/WRITE pairs, it will be appreciated that the READ/WRITE pairs could instead be provided in temporal bursts, as described above with reference to FIG. 5. In other words, it will be understood by a skilled person that embodiments of the invention may be combined in the absence of assertions to the contrary.

Optionally, in the "READ/WRITE pairs" embodiment, it is possible to iterate through at least some storage locations of the data store 14 and to READ and WRITE data values when reaching the proper location.

Creation of "Artificial Hot Spots", Etc.

If an attacker suspects that dummy access operations are being used, it might be possible to analyse the accessed storage locations to find so-called "hot spots", i.e. storage locations in the data store 14 that are accessed over and over again. Usually, a hot spot would be indicative of a real storage location rather than a dummy storage location. It might also be possible for an attacker to obtain data regarding frequencies of use of storage locations over different runs of the software application 10. Dummy storage locations might be expected to be randomly chosen, and this might enable the attacker to differentiate between real and dummy storage locations in order to start the reverse-engineering process.

In order to frustrate such an attack, the present methodology allows for the possibility of creating artificial hot spots at particular dummy storage locations in the data store 14. In other words, the present methodology provides the possibility of tricking the attacker by generating higher access frequencies for particular dummy storage locations (i.e. artificial local hot spots). Such artificial hot spots would be generated by the pattern generation module 22 under the control of associated pattern parameters 22a. For example, pattern parameters 22a could be used to control e.g. the number and/or distribution of artificial hot spots. Thus, in accordance with an artificial hot spot embodiment, the dummy access operations are arranged to access at least one specified dummy storage location in the data store more frequently than other dummy storage locations in the data store, thereby creating an artificial (or dummy) storage hot spot. Artificial storage hot spots make it difficult for an attacker to differentiate between real and dummy storage locations, and therefore make it difficult for the attacker to differentiate between real and dummy access operations. As previously mentioned, a dummy storage location is a storage location which would not otherwise be accessed as part of the execution of the software application.

An alternative way to defeat attacks which monitor the distribution of accessed storage locations is to provide a data store access pattern in which the access operations are arranged to access the data store 14 substantially evenly across at least a subset of storage locations in the data store 14. This flattens out the data store access to make it difficult to differentiate between real and dummy storage locations.

In this embodiment, there may be a similar number of access operations per storage location. For example, the number of access operations per storage location may be of the same order of magnitude for all storage locations over a given time period and over a given portion of the memory. In other words, it is possible to iterate through at least part of the data store 14 and to ensure that the level of access (i.e. the number of access operations 16 and 18) is constantly distributed amongst all storage locations in that part of the data store 14. Optionally, this levelling procedure could be performed across the entire data store 14. Optionally, where the data store 14 is split into storage regions, the level of access may be constantly distributed amongst all storage regions. Again, this can be achieved by the pattern generation module 22 as part of the data store access pattern creation.

In would also be possible to combine the artificial hot spot and levelling embodiments described above such that there are artificial hot spots created in a first portion of the data store 14, and the level of access is constantly distributed across a second portion of the data store 14.

In summary, any distribution of accessed dummy storage locations is possible. The distribution may be controlled by providing pattern parameters 22a to define the data store access pattern as desired.

Areas of Applicability

HTML5 is a set of standards put forward by W3C allowing web application developers to develop applications running in the browser that can directly use a similar set of features to native application without the need for plug-ins. The advantage of using HTML5 is that resulting applications will run in any HTML5 compatible browser installed on any platform using any OS. This results in clear cost saving for the application developers. This means that the abstraction level of the platform moved up to the browser level. Currently, HTML5 is building momentum across different markets with a high adoption rate.

HTML5 introduces a new set of features available to the application developers: e.g. client-side persistent storage, offline application mode, video rendering in the browser, or the geo-location API. Client-side persistent storage contains several types of storage accessible locally, e.g. web storage.

The data stored in any form of the local storage is exposed to an attacker controlling the platform or the browser, as it is only protected (sandboxed) by the "same domain policy" of the browser. This policy says that only applications from the same domain can access the locally stored data; this is only enforced by the browser. The local storage serves as a runtime input for the application with the web application client reading data from it, or as output for the application with the web application client writing data there. Data can be application data (say a token) or user data (e.g. user's address).

Local storage is accessed through standardised (W3C specified) API calls, e.g. READ/WRITE calls. These calls are exposed in HTML5 (JS). The same is true for file accesses from a browser application—specified by W3C and exposed in HTML5 (JS API). Therefore, the present methodology may be employed to obfuscate local storage access calls by a particular application executing on a client device. In this case, the data store 14 may be the local storage on the client device.

Thus, the present methodology has particular applications in a browser environment. The present methodology is also applicable to other "open interfaces", e.g. communicating hardware modules or hardware/software interfaces.

Additional Considerations

According to the present methodology, a data store access pattern can be changed dynamically in space and/or time so as to provide dynamic diversity.

The present methodology can be employed at run-time, and thus provides ease of implementation by supporting the READ and WRITE operations that are dynamically created at run-time.

The present methodology has other domains of applicability than simply the accessing of individual storage locations in a data store 14 as described above. For example, the methodology can also be applied at a higher level of granularity than single READ and/or WRITE operations, say at the level of blocks of READ and/or WRITE operations. The methodology can also be applied to other storage options (e.g. files). This can be done at READ and/or WRITE level, file parts level, or file level as part of a file system.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide exemplary methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks (or software modules) are merely illustrative and that alternative embodiments may merge logic blocks or elements (or software modules), or may impose an alternate decomposition of functionality upon various logic blocks or elements (or software modules).

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may together be implemented by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method, implemented by one or more processors, of obfuscating access to a local data store on a client device by a software application executed on the client device, the method comprising:
   accessing the local data store using access operations, the access operations comprising real access operations and dummy access operations, each real access operation being operable to access the local data store as part of the execution of the software application, wherein at least one of:
   (a) the dummy access operations are arranged to access at least one specified dummy storage location in a first portion of the local data store more frequently than other dummy storage locations in the local data store; and
   (b) the access operations are arranged to access a second portion of the local data store substantially evenly where a number of access operations per storage location is constantly distributed across all storage locations in the second portion of the local data store.

2. The method of claim 1 wherein the access operations are arranged to access the local data store periodically during execution of at least a portion of the software application.

3. The method of claim 1 wherein, for at least one of the real access operations, one or more dummy access operations occur in temporal proximity to said at least one real access operation.

4. The method of claim 1 wherein the access operations comprise READ operations, each READ operation being operable to read a value from a respective storage location of the local data store, the real access operations comprising one or more real READ operations and the dummy access operations comprising one or more dummy READ operations.

5. The method of claim 1 wherein the access operations comprise WRITE operations, each WRITE operation being operable to write a value to a respective storage location of the local data store, the real access operations comprising one or more real WRITE operations and the dummy access operations comprising one or more dummy WRITE operations.

6. The method of claim 1 wherein the access operations comprise READ/WRITE pairs, each READ/WRITE pair being operable to read a value from a respective storage location of the local data store and to subsequently write a value to said respective storage location, the real access operations comprising one or more real READ/WRITE pairs and the dummy access operations comprising one or more dummy READ/WRITE pairs.

7. The method of claim 6 wherein at least one of the real READ/WRITE pairs comprises a real WRITE operation of the software application that is operable to write a specified value to a specified storage location of the local data store during execution of the software application, said at least one of the real READ/WRITE pairs being operable to read a value from the specified storage location and to subsequently write the specified value to the specified storage location.

8. The method of claim 6 wherein at least one of the real READ/WRITE pairs comprises a real READ operation of the software application that is operable to read an encoded value X from a specified storage location of the local data store during execution of the software application, said at least one of the real READ/WRITE pairs being operable to read the encoded value X from the specified storage location and to subsequently write an amended encoded value X' to the specified storage location, wherein X' is chosen such that a decoded version of X' is the same as a decoded version of X.

9. The method of claim 8 wherein X and X' are decoded using an error correction code, ECC, where ECC(X)=ECC(X').

10. One or more tangible non-transitory computer readable storage media comprising computer program code which, when executed by a processor, causes the processor to obfuscate access to a local data store on a client device by a software application executed on the client device, by:
    accessing the local data store using access operations, the access operations comprising real access operations and dummy access operations, each real access operation being operable to access the local data store as part of the execution of the software application, wherein at least one of:
    (a) the dummy access operations are arranged to access at least one specified dummy storage location in a first portion of the local data store more frequently than other dummy storage locations in the first portion of the local data store; and
    (b) the access operations are arranged to access a second portion of the local data store substantially evenly where a number of access operations per storage location is constantly distributed across all storage locations in second portion of the local data store.

11. A system comprising one or more hardware processors configured to obfuscate access to a local data store on a client device by a software application executed on the client device, by:
    accessing the local data store using access operations, the access operations comprising real access operations and dummy access operations, each real access operation being operable to access the local data store as part of the execution of the software application, wherein at least one of:
    (a) the dummy access operations are arranged to access at least one specified dummy storage location in a first portion of the local data store more frequently than other dummy storage locations in the first portion of the local data store; and
    (b) the access operations are arranged to access a second portion of the local data store substantially evenly where a number of access operations per storage location is constantly distributed across all storage locations in the local data store.

* * * * *